(12) United States Patent
Khayrallah (10) Patent No.: US 8,331,495 B2
(45) Date of Patent: Dec. 11, 2012

(54) METHOD AND APPARATUS FOR AN IMPROVED WIRELESS COMMUNICATION RECEIVER

(75) Inventor: Ali S. Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 549 days.

(21) Appl. No.: 12/542,335

(22) Filed: Aug. 17, 2009

(65) Prior Publication Data

US 2011/0038402 A1    Feb. 17, 2011

(51) Int. Cl.
   *H04L 27/00*        (2006.01)
(52) U.S. Cl. ........ 375/324; 375/222; 375/229; 375/340; 375/267
(58) Field of Classification Search .................. 375/324, 375/222
   See application file for complete search history.

(56) References Cited

U.S. PATENT DOCUMENTS

| | | | | |
|---|---|---|---|---|
| 5,151,919 | A  * | 9/1992  | Dent | 370/209 |
| 6,658,071 | B1 * | 12/2003 | Cheng | 375/348 |
| 6,697,441 | B1 * | 2/2004  | Bottomley et al. | 375/340 |
| 2003/0053535 | A1 | 3/2003 | Malkov et al. | |
| 2005/0157822 | A1 | 7/2005 | Khandekar et al. | |
| 2006/0159195 | A1 * | 7/2006 | Ionescu et al. | 375/267 |

FOREIGN PATENT DOCUMENTS

| | | |
|---|---|---|
| EP | 1292077 A2 | 3/2003 |
| WO | WO 2004/010572 A1 | 1/2004 |

OTHER PUBLICATIONS

Liu Y. et al., "Soft-Decision Decoding in Asynchronous FH/SSMA Networks", Intelligent Signal Processing and Communications, 2006. ISPCS '06, Dec. 12-15, 2006, p. 752-755.
International Preliminary Report on Patentability for PCT Application No. PCT/IB2010/053692, dated Dec. 23, 2011, 18 pages.

* cited by examiner

*Primary Examiner* — Lihong Yu (57) ABSTRACT

As disclosed herein, a "super receiver" structure enriches the information provided for decoding modem bits included in a received sequence of symbols. In particular, an equalizer circuit provides joint metrics to a decoder circuit, where the joint metrics advantageously reflect joint bit probabilities. However, the metrics are computed without need for complex joint probability calculations. The decoder circuit "fuses" the joint metrics with corresponding side information, which indicates the likelihood that one or more bits represented by the joint metric take on a particular value. Such fusing biases the soft value estimation for the other bits represented by the joint metric, thus enabling the decoder to operate on refined soft values in its bit decoding operations.

20 Claims, 4 Drawing Sheets

METHOD AND APPARATUS FOR AN IMPROVED WIRELESS COMMUNICATION RECEIVER

FIELD OF THE INVENTION

The present invention generally relates to wireless communications, and particularly relates to an improved wireless communication receiver that offers performance on par with full maximum a posteriori (MAP) processing, but with reduced computational complexity.

BACKGROUND

Sophisticated receiver architectures represent an integral piece in the collection of technologies enabling the ever-increasing data rates provided by current and developing wireless communication systems. As one example, various "turbo" receivers have been proposed, to boost performance. The well known turbo coding/decoding algorithms underlie the turbo receiver concept, and turbo receivers can yield significant performance gains. But they have significant computational complexity and add large delays in processing received communication signals.

One major source of complexity in a turbo receiver architecture is the multiple reuse of the equalizer. This has triggered the development of an alternative architecture, which may be called a "super receiver", whereby the equalizer is used once, and a richer set of information than the traditional soft values is extracted from the equalizer. Then the richer information is used in interaction with the decoder to boost overall receiver performance.

The richer information can take the form of joint probabilities, extracted from a Maximum a posteriori (MAP) equalizer, in various implementations. See, for example, F. Glaschiodt, "Feedforward decoding using joint probabilities," Master's thesis at the Royal Institute of Technology, Stockholm, 2000; A. Khayrallah and G. Bottomley, "Joint probability in demodulation and decoding," Proceedings Conference on Information Sciences and Systems, 2001; and A. Khayrallah and G. Bottomley, "Methods and systems for extracting a joint probability from a map decision device and processing a signal using the joint probability information," U.S. Pat. No. 6,798,852 (2004).

Even in a super-receiver architecture, it is important to reduce complexity further. One way to do that is to address the complexity of the MAP equalizer. MAP equalizers are, in some sense, optimal, but they have significant computational complexity. Such complexity has certain disadvantages in the mobile environment, given the constraints typically imposed by that environment on computational resources, speed, and power consumption.

As for simplifications to MAP-based processing, there are known "approximations" of the MAP equalizer, where one or more computational aspects of the "exact" (fully implemented, probability-based) MAP equalization are simplified, possibly at the expense of equalizer performance. In general, it is known to approximate MAP at least roughly by generating a type of soft value from a Maximum Likelihood Sequence Estimation (MLSE) process. One such approach is "cheap" Soft Output Viterbi Algorithm (SOVA). At a high level, cheap SOVA can be regarded as a rough approximation of MAP.

In order to use a cheap SOVA equalizer in a super-receiver architecture, it is necessary to extract an approximation to joint probability information from it. A method for extracting joint soft values, which are equivalent to an approximation of joint probabilities, is presented in A. Khayrallah, "Feedforward Receiver and Method for Reducing Inter-Symbol Interference by Using Joint Soft Values," identified by U.S. patent application Ser. No. 12/342,470, and filed 23 Dec. 2008.

Simplified MAP (SMAP) is a more complex approximation of exact MAP than cheap SOVA, but one that usually yields better performance. Exact MAP relies on operations of the form $$c = -\ln(e^{-a} + e^{-b}). \qquad (Eq.\ 1)$$

See, e.g., L. Bahl, J. Cocke, F. Jelinek, and J. Raviv, "Optimal decoding of linear codes for minimizing symbol error rate," IEEE Trans. Inform. Thy., pp. 284-287, March 1974. In contrast, in one approach to SMAP, operations of the form shown in (Eq. 1) are replaced with $$c \approx \min(a, b). \qquad (Eq.\ 2)$$

In the SMAP context, $a$, $b$, and $c$ represent metrics, whereas in exact MAP their negative exponentials represent probabilities. One benefit of shifting from the probability domain to the metric domain is a more manageable dynamic range. Another benefit is that the required iterations become the same as those of a MLSE. See, for example, A. Viterbi, "An intuitive justification and a simplified implementation of the MAP decoder for convolutional codes," IEEE J-SAC, pp. 260-264, February 1998.

In order to use SMAP equalizer in a super-receiver architecture, it is necessary to extract an approximation to joint probability information from it. The present invention provides a method for extracting quantities called joint metrics from the SMAP equalizer, which can then be used in interaction with the decoder to boost overall performance.

SUMMARY

According to one or more aspects of the invention presented in this disclosure, a "super receiver" structure enriches the information provided for use in decoding the modem bits included in a received sequence of symbols. In particular, an equalizer circuit provides joint (soft) metrics to a decoder circuit. The joint metrics are processed with side information from the decoder to provide refined soft values. Those refined soft values may be fed to the decoder for improved performance. Advantageously, the joint metrics reflect joint bit probabilities but they are computed without need for complex joint probability calculations. For example, in one or more embodiments, the joint metric for a subset of bits in the received sequence of symbols is computed using a "min" function of the forward and backward recursion state metrics from the equalization trellis stages associated with that subset of bits, along with the associated branch metrics. By evaluating this function over the possible combinations of bit values for the subset, the contemplated receiver obtains a set of joint metrics that are fed forward to the decoder, for improved decoding.

On that point, the feedforward nature of the contemplated receiver architecture avoids reuse of the equalizer, which is unlike turbo receiver structures that characteristically rely on the feedback of side information from decoder to equalizer. As equalizer reuse often dominates receiver complexity, the disclosed feedforward architecture provides potentially significant processing simplifications.

According to one aspect of the invention presented in this disclosure, a receiver circuit incorporating a new "JSMAP" equalizer is proposed, where "MAP" denotes "maximum a posteriori.", S denotes simplified, and J denotes joint metric. The new JSMAP equalizer makes use of advantageously derived joint metrics as an improvement over simplified MAP (SMAP) processing and thereby gains receiver performance improvements over SMAP, with only incremental increases in complexity. In particular, in one or more embodiments, the inventive JSMAP equalizer produces refined soft values for improved detection and decoding performance, through the use of joint metrics.

In at least one embodiment, the present invention provides a method for generating joint metrics for multiple bits from different stages in the JSMAP equalizer. Here, the JSMAP equalizer in some sense may be regarded as a modified and improved form of the SMAP equalizer. The joint metrics on which the refined soft values are based allow an associated decoder circuit to exploit "side information." In particular, the decoder circuit exploits the side information for improved estimation of bit soft values. For example, the side information can be generated by subtracting output soft values from a decoder stage from the corresponding initial soft values, as estimated by the equalizer.

In at least one embodiment of the present invention, a receiver circuit is configured for decoding modem bits from a received sequence of symbols. The receiver circuit comprises an equalizer circuit and an associated decoder circuit. The equalizer circuit is configured to compute joint metrics, where each joint metric corresponds to a subset of the modem bits conveyed in the received sequence of symbols and indicates the likelihoods of those modem bits taking on certain bit values. As an example, the equalizer circuit is configured to determine a set of joint metrics for each subset of bits. The set of joint metrics computed for a given subset of bits is based on forward recursion state metrics, backward recursion state metrics, and associated branch metrics, from equalizer trellis stages associated with the subset.

In turn, the decoder circuit is configured to generate "side information" for at least some of the modem bits represented in the joint metrics. Here, the side information for a given modem bit indicates that the given modem bit is more likely to have a particular bit value. Further, the decoder circuit is configured to combine each joint metric with the side information for one or more modem bits represented in the joint metric. Doing so obtains refined soft values for one or more remaining modem bits represented in the joint metric. Still further, the decoder circuit is configured to decode the refined soft values to recover corresponding modem bits from the received sequence of symbols, for those remaining modem bits that are coded, and, for those remaining modem bits that are uncoded, to produce an improved estimate.

The above-described receiver circuit is implemented in dedicated hardware, in one or more embodiments. In other embodiments, it is implemented in a digital processor, based on the execution of computer program instructions, which are stored as a computer program in non-volatile memory, or in some other computer-readable medium included in or otherwise accessible to the receiver circuit. As a non-limiting example, the receiver circuit comprises one or more microprocessor-based circuits—which may be digital signal processors, or other such processors that are adapted for signal processing operations.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a diagram of a conventional equalizer trellis, while

DETAILED DESCRIPTION

Figure 1:
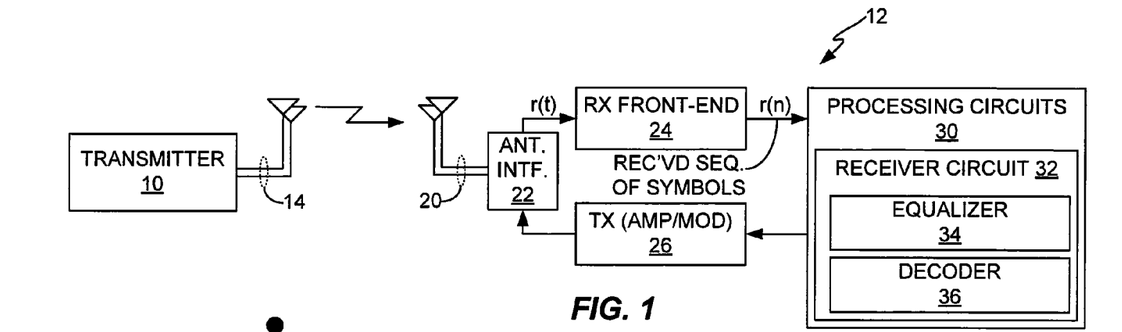
FIG. 1 is a block diagram of one embodiment of a wireless communication receiver, as contemplated herein, and where the receiver is shown in context with a transmitter.

FIG. 1 illustrates a transmitter 10, transmitting one or more downlink signals to a wireless communication receiver 12, via one or more transmit antennas 14. As a non-limiting example, the transmitter 10 comprises a base station operating in a wireless communication network—e.g. a "NodeB" in a Wideband CDMA network, or an eNodeB (enhanced NodeB) in a Long Term Evolution (LTE) or LTE Advanced network. Correspondingly, by way of non-limiting example, the receiver 12 comprises a wireless communication device adapted for operation in such a network. For example, the receiver 12 comprises a mobile terminal, such as a cellular telephone (including smart phones, PDAs, etc.), or some other item of user equipment.

The receiver 12 includes one or more receive antennas 20—which also may be used for transmission—and an associated antenna interface 22, for interfacing the antenna(s) 20 to a receiver front-end circuit 24, and possibly with a transmit circuit 26 (power amplification, modulation, etc.). As an example, the receiver front-end 24 includes receive filters, automatic gain control amplifiers, and down-conversion and associated digitization circuits, for producing one or more streams of digitized sample values corresponding to the antenna-received signals r(t). In the diagram's example, the signal r(n) is a digital baseband representation of r(t), or selected components of r(t).

Of more particular interest to the improved receiver architecture disclosed herein, the receiver 12 includes one or more processing circuits 30, which comprise dedicated signal processing hardware, or one or more programmable digital processors, or some mix thereof. By way of non-limiting example, the one or more processing circuits 30 comprise a microprocessor-based circuit—such as a digital signal processor—which may be a stand-alone circuit or may be integrated into a larger Application Specific Integrated Circuit (ASIC), a multi-chip module, a Field Programmable Gate Array (FPGA), etc. In such embodiments, it will be understood that the one or more processing circuits 30 include or are associated with a computer-readable medium (e.g. EEPROM or FLASH memory) that stores a computer program comprising program instructions for implementing the receiver method disclosed herein.

The one or more processing circuits 30 include a receiver circuit 32 that in turn includes an equalizer circuit 34 and a decoder circuit 36. The receiver circuit 32 is configured for decoding modem bits from a received sequence of symbols, such as that output by the receiver front-end circuit 24. Supporting the desired decoding operations, the equalizer circuit 34 is configured to compute joint metrics, each joint metric corresponding to a subset of the modem bits conveyed in the received sequence of symbols and indicating the likelihoods of those modem bits taking on certain bit values.

Correspondingly, the decoder circuit 36 is configured to generate side information for at least some of the modem bits represented in the joint metrics. Here, the "side information" for a given modem bit indicates that the given modem bit is more likely to have a particular bit value. The decoder circuit 36 is further configured to combine each joint metric with the side information for one or more modem bits represented in the joint metric, to obtain refined soft values for one or more remaining modem bits represented in the joint metric. For those remaining modem bits that are coded, the decoder circuit 36 is configured to decode the refined soft values to recover corresponding modem bits from the received sequence of symbols, and, for those remaining modem bits that are uncoded, to produce an improved estimate.

Figure 2:
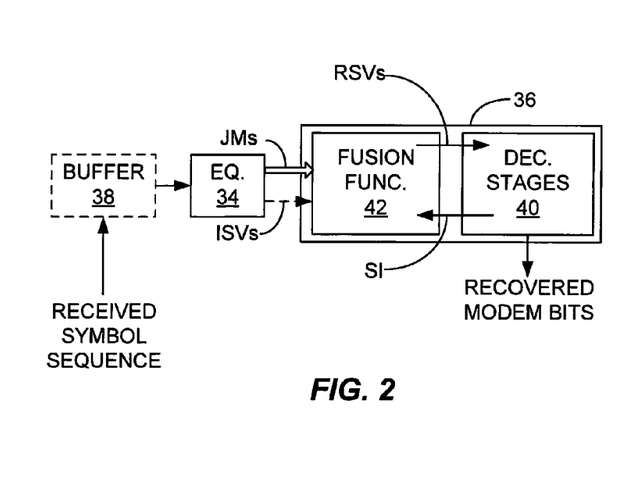
FIG. 2 is a block diagram of functional circuit details, for one embodiment of the receiver circuit shown in FIG. 1.

FIG. 2 illustrates one embodiment of the receiver circuit 32, including the equalizer circuit 34 and decoder circuit 36. In the diagram, joint metrics are abbreviated as "JMs," initial soft values as "ISVs," side information as "SI," and refined soft values as "RSVs." Further, the equalizer circuit 34 is shown in conjunction with a preceding buffer 38, which may comprise working memory within or available to the receiver circuit 32. Received symbol sequences and associated working data are held in the buffer, for processing by the equalizer circuit 34. (Additional buffering may be included in the decoder circuit 36 and/or between the equalizer circuit 34 and the decoder circuit 36. Additional buffering is not shown, for ease of illustration).

Processing by the equalizer circuit 34 of the received symbol sequence produces a number of joint metrics, with each joint metric corresponding to a subset of the modem bits conveyed in the received sequence of symbols. Each joint metric indicates the likelihoods of its corresponding subset of modem bits taking on certain bit values. The equalizer circuit 34 also produces initial soft value estimates of the individual modem bits comprising the received symbol sequence, with these soft values referred to as initial soft values.

Thus, the decoder circuit 36 receives a number of joint metrics, corresponding to subsets of modem bits in the received symbol sequence, and corresponding initial soft values for those individual modem bits. One or more decoding stages 40 in the decoder circuit 36 are configured to generate side information corresponding to the joint metrics. That is, the side information for a given joint metric provides additional information about the value of one or more of the modem bits represented in that joint metric. The side information for a given modem bit indicates that the given modem bit is more likely to have a particular bit value.

A "fusion function" 42 within the decoder circuit 36 uses the joint metrics and the corresponding side information to produce refined soft values for decoding. For example, assume that the subsets of bits are formed as pairs of individual bits from the received symbol sequence. The joint metrics for each pair of bits may be, for example, four joint metrics, each one indicating the likelihood that the pair of bits takes on a given combination of possible values. In turn, the side information corresponding to the pair of bits comprises additional information indicating which of the possible bit values is more likely for one or both of the bits in the pair. Thus, side information about one of the bits in the pair can be used to improve the soft value estimate for the other bit.

With this in mind, the contemplated fusing function 42 is a functional circuit element that "fuses" each joint metric from the equalizer circuit 34 with corresponding side information, to generate refined soft values from the initial soft values. As an example, the fusing function 42 receives side information for one or more modem bits represented in a given joint metric, where that side information provides additional information about the likelihood of those one or more modem bits taking on certain bit values, and it uses that additional information to refine the soft value estimate of one or more of the remaining modem bits represented in the joint metric. These refined soft values provide for improved decoding accuracy in the recovered modem bits output by the decoder circuit 36.

Figure 3:
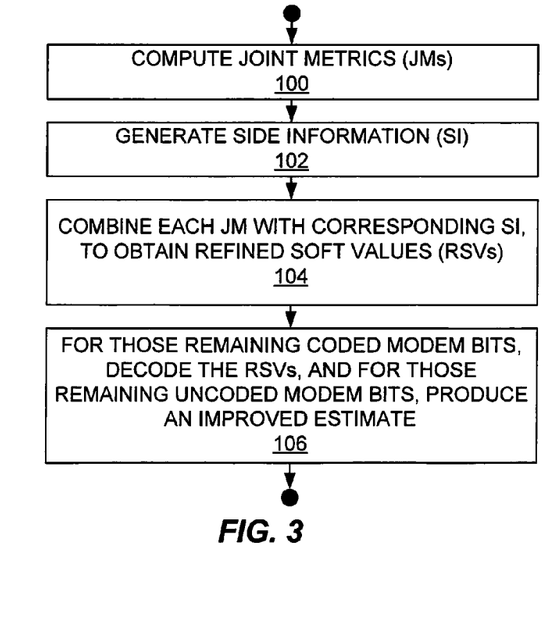
FIG. 3 is a logic flow diagram for one embodiment of a method of processing a sequence of received symbols.

FIG. 3 broadly summarizes such processing by depicting a method implemented in a wireless communication receiver of decoding modem bits from a received sequence of symbols—e.g. a method implemented by the receiver 12 of FIG. 1. The method comprises computing joint metrics (Block 100). As noted, each joint metric corresponds to a subset of the modem bits conveyed in the received sequence of symbols and indicates the likelihoods of those modem bits taking on certain bit values.

Processing continues with generating side information for at least some of the modem bits represented in the joint metrics (Block 102). Here, the side information for a given modem bit indicates that the given modem bit is more likely to have a particular bit value. Still further, processing continues with combining each joint metric with the side information for one or more modem bits represented in the joint metric, to obtain refined soft values for one or more remaining modem bits represented in the joint metric (Block 104). The method continues with decoding the refined soft values to recover corresponding modem bits from the received sequence of symbols, for those remaining modem bits that are coded, and, for those remaining modem bits that are uncoded, producing an improved estimate (Block 106).

As regards FIG. 3, in at least one embodiment, the receiver circuit 32 is configured to generate the side information by demodulating a sequence of received symbols to produce a block of initial soft values, each representing the soft-value estimate for a bit conveyed in the received symbol sequence. These initial soft values are output from the equalizer circuit 34, for further processing by the decoder circuit 36, which is configured to decode the block of initial soft values, to obtain a corresponding block of output soft values. To obtain the side information for a given one of the modem bits in the block, the decoder circuit 36 subtracts the corresponding initial soft value from the corresponding output soft value.

Further, in at least one embodiment, the decoder circuit 36 is configured to generate the side information by, in a first decoding iteration, generating a block of initial soft values corresponding to individual bits in a block of modem bits conveyed in the received sequence of symbols and decoding the block of initial soft values to obtain a corresponding block of output soft values. As such, to obtain the side information for a given modem bit in the block, the decoder circuit 36 subtracts the corresponding initial soft value from the corresponding output soft value.

Further, in at least one embodiment, the equalizer circuit 34 is configured to select the subsets of modem bits for which joint metrics are computed by, for a given joint metric, selecting a first modem bit that is a coded bit in a first codeword, and selecting a second modem bit that is un-coded or belongs to a separate, second codeword. Correspondingly, the decoder circuit 36 is configured to generate the side information for the first modem bit in the given joint metric by decoding the first codeword according to any included error detection or correction coding, and subtracting the resulting output soft value from the corresponding input soft value used for said decoding of the first codeword.

Further, in at least one embodiment, the equalizer circuit 34 is configured to select the subsets of modem bits for which joint metrics are computed by, for a given joint metric, selecting a first modem bit that is earlier in a codeword, and selecting a second modem bit that is later in the same codeword. Still further, as noted, in one or more embodiments, the equalizer circuit 34 comprises a joint simplified maximum a posteriori (JSMAP) equalizer. In such embodiments, the equalizer circuit 34 is configured to select the subsets of modem bits for which joint metrics are computed by selecting the subsets of modem bits as pairs of modem bits from consecutive trellis stages in the JSMAP equalizer.

Alternatively, the equalizer circuit 34 is configured to select the subsets of modem bits for which joint metrics are computed as multiple modem bits from multiple, consecutive trellis stages in the JSMAP equalizer. Further, in at least one embodiment of the contemplated JSMAP implementation, the equalizer circuit 34 is configured to compute joint metrics for each given subset of modem bits, where the joint metrics are defined as a function of forward and reverse branch metrics and state metrics, from trellis stages of the JSMAP equalizer that are associated with the given subset of modem bits.

With the above processing in mind, the discussion turns to example mathematical developments as an aid to further understanding the example embodiments. Consider a generalized scenario, where a conventional, given receiver uses an SMAP equalizer to compensate for inter-symbol interference (ISI) that is caused by one or more of the following: partial response signaling, coded modulation, transmit filter, dispersive channel, receive filtering, timing offset, etc.

The equalizer trellis captures all the relevant details of the system, where these details include the modulation constellation in use, for instance. In a multiple stream transmission, the constellation represents the simultaneous streams. That is, a single 16QAM stream is represented by the sixteen modulation constellations points defined for that format, while a two stream 16QAM transmission is represented by a size-256 constellation. Further, in a multiple antenna receiver, the different antenna signals contribute to the branch metric. In any case, the overall ISI is represented in the state space of the equalization trellis and in its state transitions. Such an equalizer can handle a very general system model.

One aspect of the transmission scheme is the modulator mapping. For instance, in uncoded 16QAM, there is a mapping from groups of four bits to one of the sixteen defined modulation symbols. With coded modulation, e.g. trellis-coded modulation, the mapping description is more involved. For instance, in trellis-coded 16QAM with an imbedded rate three-fourths (¾) code, groups of three bits map into modulation symbols. Regardless, it is clear what the modulation mapping is from the context of the particular transmission scheme.

Assuming a given symbol represents a bits, one may consider a specific bit x among the a positions, (as in the third bit out of four bits). With this notation, one may group a given set of symbols according to their values of the bit in the x position. Further, assume that an SMAP equalizer demodulates a burst of T symbols. To do so, the trellis has T transitions. The beginning state is labeled with the index t=0, and the ending state is labeled with the index t=T. Without much loss of generality, one may assume that the equalizer trellis is terminated in state 0 at both ends.

Figure 4:
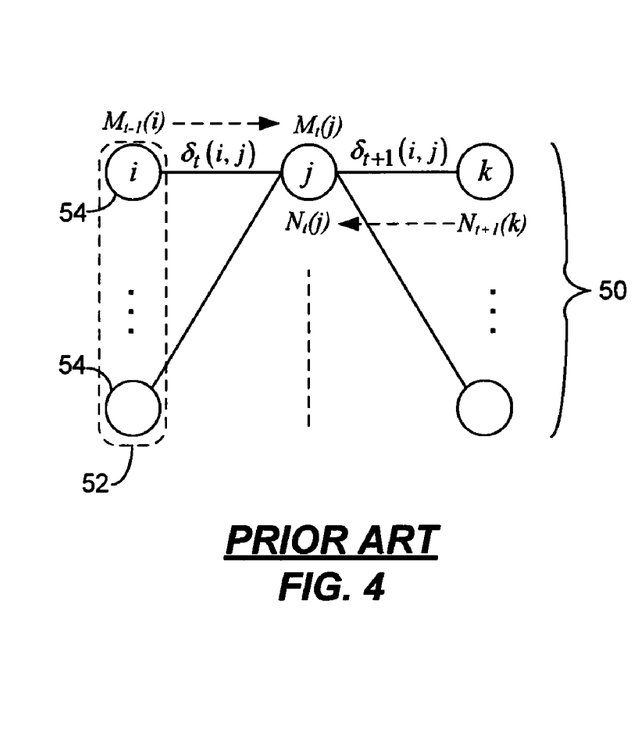

As a simplified example, consider the conventional equalizer trellis 50 shown in FIG. 4. The trellis 50 comprises a number of successive trellis stages 52, with each stage 52 comprising a number of states 54. Each stage 52 corresponds to a symbol position/time of the received sequence of T symbols, and each state 54 within a given stage 52 is defined as a unique combination of the possible bit values that can be taken on by a symbol according to the defined modulation constellation.

Notably, in the illustration, there is at most one branch per transition between the states 54. That is, a branch starting in state i at index t−1 and ending in state j at index t is identified as (i,j). Correspondingly, the branch metric is denoted as $\delta_t(i,j)$. As such, for forward metric recursion, the forward state metric $M_t(j)$ for state j at time t is given by $$M_t(j) = \min_i \{M_{t-1}(i) + \delta_t(i, j)\}, \quad \text{(Eq. 3)}$$

where $M_{t-1}(i)$ is the forward state metric for state i obtained from the MLSE forward recursion at index t−1. At index t=0, $M_0(0)=0$, and $M_0(i)=\infty$ otherwise. Further, the backward state metric $N_t(j)$ for state j at time t is given by $$N_t(j) = \min_k \{\delta_{t+1}(j, k) + N_{t+1}(k)\}, \quad \text{(Eq. 4)}$$

where $N_{t+1}(k)$ is the forward state metric for state k obtained from the MLSE backward recursion at index t+1. At index t=T, $N_T(0)=0$, and $N_T(k)=\infty$ otherwise.

Now, the bit metric for a bit x among the group of a bits that maps into the modulation symbols at index t is given by $$L_t(x) = \min_{(i,j) \in \Omega(x)} \{M_{t-1}(i) + \delta_t(i, j) + N_t(i)\}, \quad \text{(Eq. 5)}$$

where $\Omega(x)$ denotes the set of branches (i,j) with the bit x set to 0 or 1. Continuing with this development, the soft value is given by $$\lambda_t = L_t(1) - L_t(0). \quad \text{(Eq. 6)}$$

Thus a negative (positive) value of $\lambda_t$ indicates that x is 1 (0).

Figure 5:
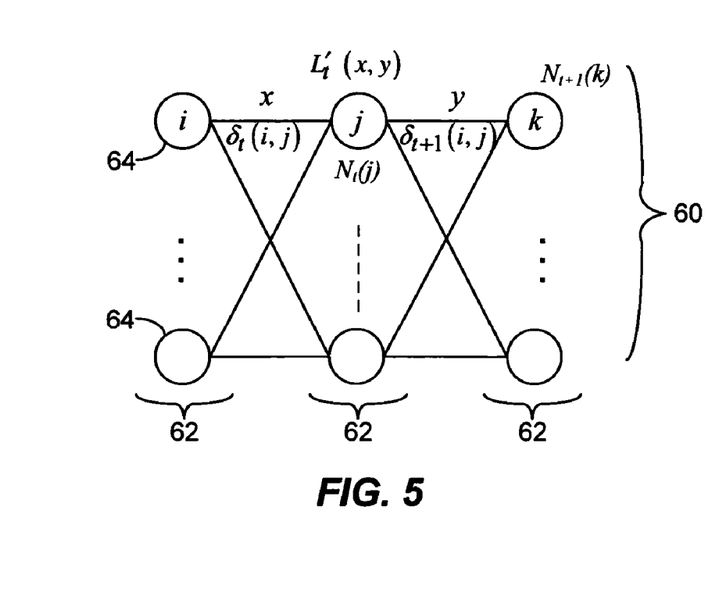
FIG. 5 is a diagram of one embodiment of an equalizer trellis, as used to compute simplified joint metrics for improved decoding.

These observations inform the generation of an advantageous joint metric, as is contemplated in this disclosure for joint metric generation. FIG. 5 illustrates a configuration for the equalizer circuit 34, comprising an equalizer trellis 60 that includes a number of successive stages 62, with each stage comprising a number of states 64.

A joint metric is first described for a pair of bits from two consecutive trellis stages 62. This derivation is then extended to multiple bits from multiple stages 62. Such workings may be further extended to a pair of bits from non-consecutive stages 62, and so on. For completeness, the contemplated joint metric is described for the degenerate case of bits from the same stage 62. Finally, the disclosure describes the interaction between the joint metric and a variant of the decoder circuit 36 that produces soft values for modem bits. Two scenarios are considered in this context: one scenario where the bits in the joint metric belong to separate codewords, and a scenario where the bits in the joint metric belong to the same codeword.

Still referring to FIG. 5, one may consider two bits, x from index t, and y from index t+1. Using the forward and backward state metrics, and branch metrics, as before, the joint metric for the bit pair (x,y) is defined as $$L'_t(x, y) = \min_{(i,j,k) \in \Omega'(x,y)} \{M_{t-1}(i) + \delta_t(i, j) + \delta_{t+1}(j, k) + N_{t+1}(k)\}. \quad \text{(Eq. 7)}$$

The triplet (i,j,k) denotes two consecutive connected branches, (i,j) from index t, and (j,k) from index t+1. Also, the set Ω'(x,y) contains the triplets (i,j,k), where branch (i,j) has bit x set to 0 or 1, and branch (j,k) has bit y set to 0 or 1. For this example embodiment, the set of four values of L'$_t$(x,y) make up the information comprising the joint metric. And in this sense it is instructive to show how L'$_t$(x,y) contains all the information about x and y viewed individually. In that sense, the joint metric plays a similar role to joint probability—as used in exact MAP—in regards to individual, or marginal, probability. Yet the disclosed method of joint metric derivation avoids the undesirable computational complexity associated with the use of joint probabilities required in exact MAP.

Consider, for example, the case of finding the information for y. Specifically, consider the quantity $$\min\{L'_t(x=0,y), L'_t(x=1,y)\}. \quad \text{(Eq. 8)}$$

Note that taking the minimum of the two minima over the sets Ω'(x=0,y) and Ω'(x=1,y), is equivalent to the minimum over their union Ω'(x=0,y)∪Ω'(x=1,y). In turn, the union set removes the constraint over the (i,j) pair of the triplet (i,j,k), since (i,j) may be labeled x=0 or x=1.

From the above, one may write $$\min\{L'_t(x = 0, y), L'_t(x = 1, y)\} = \quad \text{(Eq. 9)}$$
$$\min_{(j,k) \in \Omega_y} \left\{ \min_i \{M_{t-1}(i) + \delta_t(i, j)\} + \delta_{t+1}(j, k) + N_{t+1}(k) \right\}$$
$$\min_{(j,k) \in \Omega_y} \{M_t(j) + \delta_{t+1}(j, k) + N_{t+1}(k)\} = L_{t+1}(y).$$

Similarly, it can be shown that $$\min\{L'_t(x,y=0), L'_t(x,y=1)\} = L_t(x). \quad \text{(Eq. 10)}$$

As such, (Eq. 9) and (Eq. 10) are the only intermediate steps needed in the evaluation of L$_t$(x) and L$_t$+1(y). The introduction of side information about one of the bits in the form of a bias to the joint metric makes it much more useful, as it helps improve the decision about the other bit.

As an example, the side information about bit y comes from the decoder circuit 36. The side information is expressed as an additive bias term µ'(y). A positive (negative) value of µ'(y) indicates a bias towards y=1 (0). For a given bit pair (x,y), the side information µ'(y) can be incorporated into the corresponding two candidate metrics that have y=0, yielding $$\hat{L}'_t(x,0) = L'_t(x,0) + \mu'(y). \quad \text{(Eq. 11)}$$

That is, the joint metric for the (x,y) bit pair includes representations corresponding to the four possible combinations of bit values for the pair, namely, bit values (0,0), (0,1), (1,0), and (1,1). The two metrics corresponding to y=0 are modified using the side information for y. Conversely, the two metrics corresponding to y=1 are unchanged, as shown below $$\hat{L}'_t(x,1) = L'_t(x,1). \quad \text{(Eq. 12)}$$

Thus, the receiver circuit 32 uses side information about y to improve the decision about its neighboring bit x. The biased metric for x is given by $$\hat{L}_t(x) = \min\{\hat{L}'_t(x, 0), \hat{L}'_t(x, 1)\} \quad \text{(Eq. 13)}$$
$$= \min\{L'_t(x, 0) + \mu'(y), L'_t(x, 1)\}.$$

Also, the biased soft value—referred to as a refined soft value—for x is given by $$\hat{\lambda}_t(x) = \hat{L}_t(1) - \hat{L}_t(0). \quad \text{(Eq. 14)}$$

indicating that the side information µ'(y) may cause a different decision about x. Similarly, the receiver circuit 32 may be configured to incorporate side information µ'(x) about x as a bias. In that case, the receiver circuit 32 adds the side information for x to the two metrics with x=0, eventually yielding a biased soft value for y.

Using the same approach, one may consider two separate cases of side information from the decoder circuit 36. In the first the case, one bit in the joint metric pair is a coded bit in a codeword, while the other bit is uncoded, or belongs to a separate codeword. Then the interaction between the decoder circuit 36 and the joint metric is limited to the side information output from the decoder circuit 36. That is, the decoder circuit 36 can operate in normal block fashion, defined by the codeword, and can process all its input, and produce its output in one block. Then the side information is sent to the joint metric for fusion and refined soft value generation, as just described.

In the second case, the bits in the joint metric belong to the same codeword. Then the interaction can take different forms. In one approach, the interaction between the decoder circuit 36 and the joint metric remains in block fashion. In another approach, the interaction between the decoder circuit 36 and the joint metric occurs progressively within a single decoding operation, and the decoder circuit 36 includes particular modifications supporting this approach. In such contexts, in contrast to a generic, conventional decoder, which is normally concerned with producing soft (or hard) values about information bits, the decoder circuit 36 in such embodiments is configured to produce output soft values corresponding to the modem bits.

With such scenarios in mind, in one or more embodiments, the decoder circuit 36 is built based on a MAP decoder architecture. That is, the decoder can be a MAP decoder (using exponentials, etc.). However, other types of decoders, such as cheap SOVA and SMAP decoder architectures, could be modified along the same lines and used to practice variations of the above-described processing.

Figure 6:
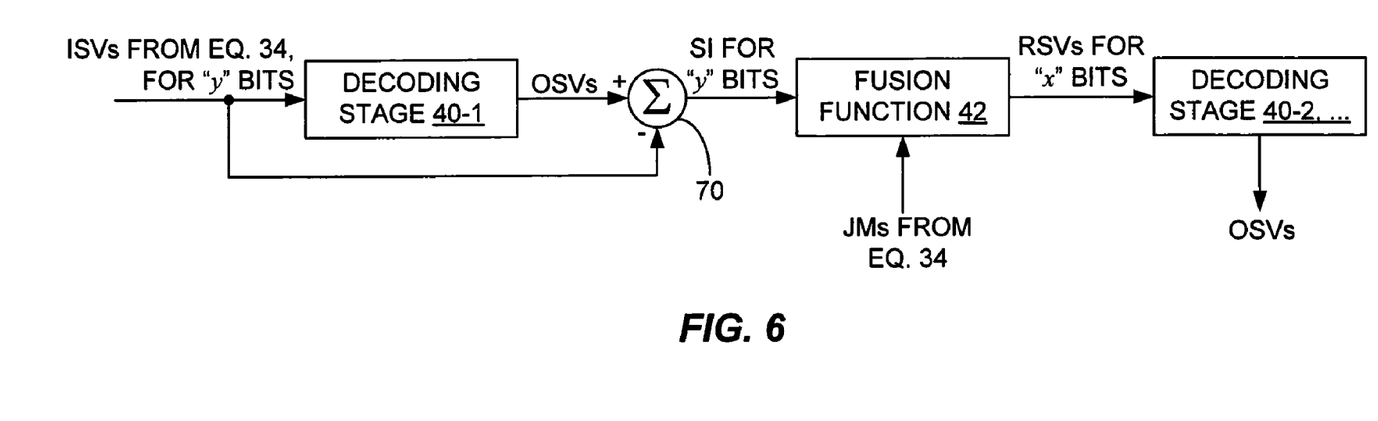
FIGS. 6 and 7 are block diagrams illustrating two different embodiments of the contemplated equalizer and decoder circuits.

In the context of side information for separate codewords, and without much loss of generality, consider the scenario where bit y in the pair belongs to a codeword, while bit x either is uncoded, or belongs to a separate codeword. This scenario is suited for certain error control schemes in speech coding, which use separate coding of different bit classes, or leave certain bits uncoded. Referring to FIG. 6, the side information is identified with µ'(y), as y is a bit in the codeword. As such, the decoder circuit 36 can fuse µ'(y) as a bias in the corresponding joint metric, using (Eq. 11)-(Eq. 14). That processing refines the soft value for the x bit in the joint metric. Note that in keeping with the idea of the super receiver contemplated herein, the equalizer 36 is not involved beyond its contribution of the joint metrics. The interaction is between the decoder circuit 36 and the joint metrics.

In more detail, one sees that a first decoding stage 40-1 receives initial soft values (for individual modem bits) from the equalizer circuit 34, and produces output soft values therefrom (abbreviated in the illustration as OSVs). For each bit, the corresponding initial soft value is subtracted from the corresponding output soft value, via the summing circuit 70. The resulting difference serves as the side information for that bit. The subtraction performed here avoids the over-counting phenomenon, which has been identified in the study of turbo codes See, e.g., C. Berrou, A. Glavieux and P. Thitimajshima, "Near Shannon Limit Error-Correcting Coding and Decoding: Turbo-Codes", Proceedings IEEE ICC, 1993.

Continuing with the illustration details, the side information generated for the "y" bits, for a given plurality of (x,y) modem bit pairs, is provided to the fusion function 42, along with the corresponding joint metrics from the equalizer circuit 34. The fusion function 42 uses such information to produce refined soft values for the x bits represented in those joint metrics. One or more additional decoding stages 40 (e.g. a decoding stage 40-2) in the decoder circuit 36 can then be used to decode the refined soft values.

Figure 7:
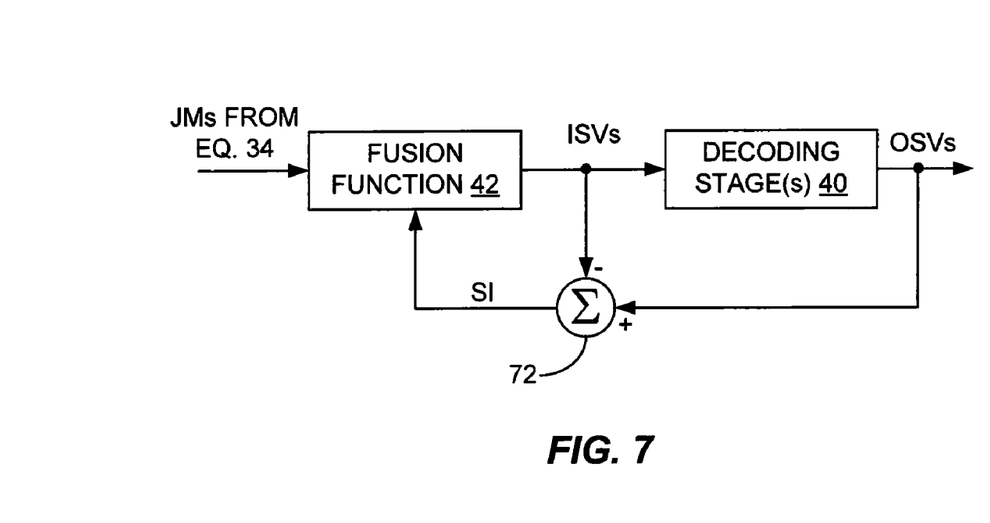

In another example, relating to a block approach for joint metric bit pairs in the same codeword, the decoder circuit 36 is used two or more times in block mode, in interaction with the joint metrics. Referring to FIG. 7, the joint metrics are received at the decoder circuit 36, from the equalizer circuit 34. Again, the equalizer is not involved any further beyond providing the joint metrics for richer decoding, along with providing the initial soft values.

In the initial iteration, the decoder circuit 36 accepts a block of initial soft values from the equalizer circuit 34 (shown as ISVs), and produces a corresponding block of output soft values. These output soft values are used to produce a corresponding block of side information via the summing circuit 72 (based on subtraction, much as described for FIG. 6). In turn, the side information is fed to the fusion function 42, which uses it to produce a block of new soft values, which are "refined" according to the use of JMs and SI, as taught herein. In the second iteration, the decoder circuit 36 accepts the block of new soft values, produces a block of new output soft values, and so on.

Yet another example considers side information for a common codeword, but based on a progressive approach. Again, one may consider the scenario where the joint metric bit pair belongs to the same codeword. According to this embodiment, output soft values corresponding to "early" modem bits in the codeword are used to modify the initial soft values for "later" modem bits in the same codeword. Unlike the two block approaches shown in FIGS. 6 and 7, this approach modifies the inner workings of the decoder 36.

Figure 8:
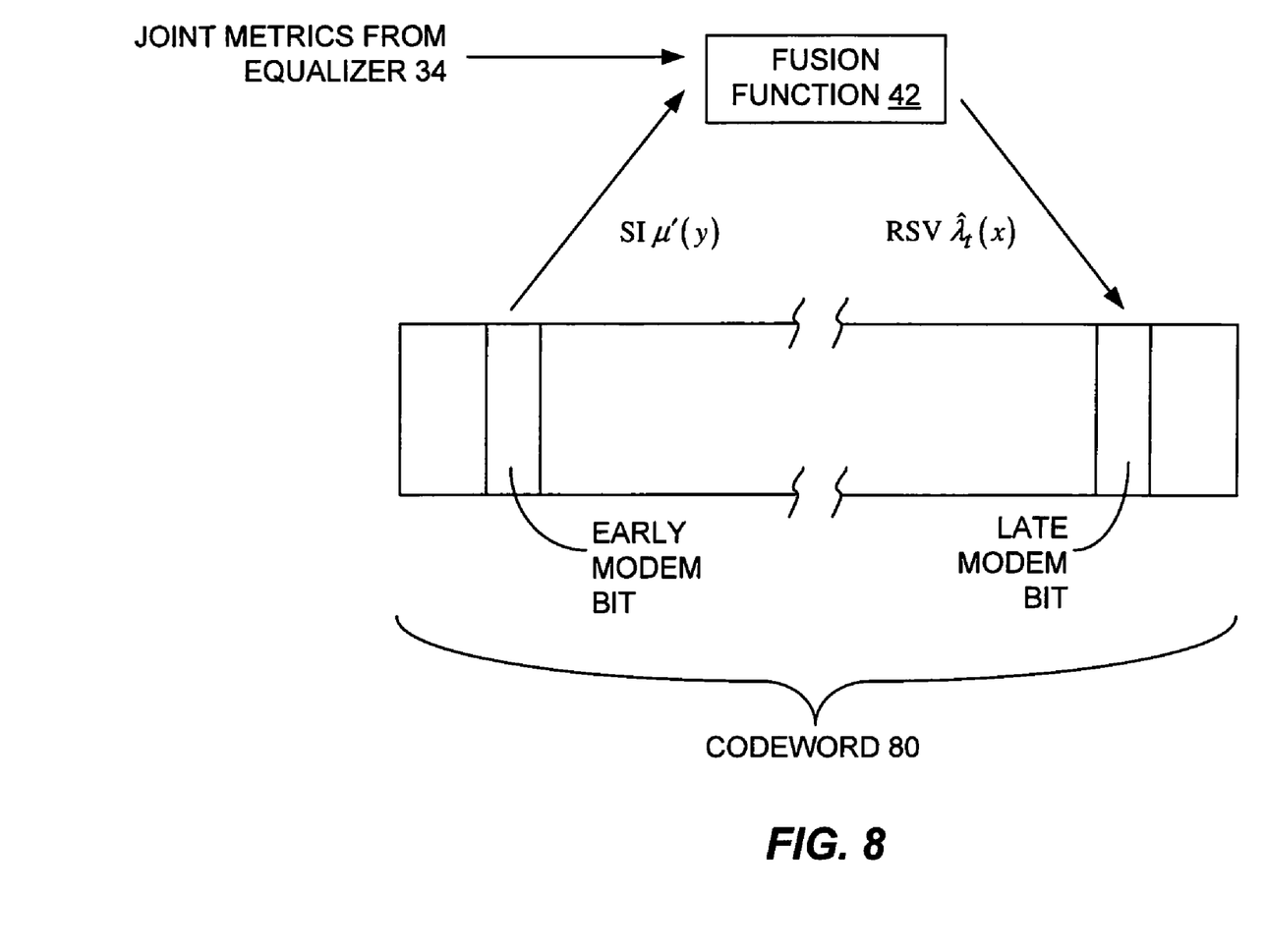
FIG. 8 is a block diagram illustrating one embodiment of fusing operations, as applied to early and later modem bits within the same codeword in a received sequence of symbols.

Without much loss of generality, FIG. 8 illustrates the above scenario with a convolutional code. The decoder circuit 36 has a decision depth d, which means that after d stages, the decoder circuit 36 produces output soft values for the modem bits corresponding to a first stage. After (d+1) stages, the decoder produces OSV's for the modem bits of the second stage, and so on.

As shown in FIG. 8, the fusion function 42 accepts the joint metrics from the equalizer 34. For the first d stages, the original input soft values are fed to the decoder circuit 36. After d stages, the output soft values begin to come out. Going back to a given original bit pair (x,y), suppose that y appears before x in the illustrated codeword 80, and that they are separated by no less than d stages. Then, a refined soft value for x can be produced and substituted for the original (initial) soft value of x before the decoder circuit 36 needs to process it. To do so, an initial soft value is subtracted from the corresponding output soft value, to produce the side information, all for y. The side information is fed to the fusion function 42 to produce the refined soft value for x. This in turn improves the overall decoder performance.

As for other extensions of the contemplated processing, the above ideas can be extended to non-neighboring stages. That is, it is possible to consider the joint metrics for modem bits from non-neighboring stages. For instance, consider two bits, x from index t, and y from index t+2. Using the forward, backward state metrics, branch metrics as before, one can extend (Eq. 7) to write the joint metric for the bit pair (x,y) as $$L'_t(x, y) = \min_{(i,j,k,l) \in \Omega'(x,y)} \{M_{t-1}(i) + \delta_t(i, j) + \delta_{t+1}(j, k) + \delta_{t+2}(k, l) + N_{t+2}(l)\}. \quad \text{(Eq. 15)}$$

The quadruplet (i,j,k,l) denotes three consecutive connected branches, (i,j) from index t, (j,k) from index t+1, and (k,l) from index t+2. Also, the set $\Omega'(x,y)$ contains the quadruplets (i,j,k,l), where branch (i,j) has bit x set to 0 or 1, and branch (k,l) has bit y set to 0 or 1.

It is also possible to consider the joint metric for two bits (out of a total bits) mapping into the same symbol, and consequently appearing in the same stage of the trellis. This can be viewed as a degenerate case, but it is covered for completeness. One can extend (Eq. 5) to write the JM for the bit pair (x,y) as $$L'_t(x, y) = \min_{(i,j) \in \Omega'(x,y)} \{M_{t-1}(i) + \delta_t(i, j) + N_t(j)\}. \quad \text{(Eq. 16)}$$

Here, the set $\Omega'(x,y)$ includes the branches (i,j) with bit x set to 0 or 1, and bit y set to 0 or 1.

It is also possible to further extend the idea of the joint metric to multiple bits, including neighboring or non-neighboring stages, and single or multiple bits per stage. This can be done by extending the formulation of the joint metric, as done in the two examples immediately above.

Window size is a further consideration. The earlier description of SMAP assumed that the whole burst is processed simultaneously, and that there is enough memory to store all the branch metrics and all the forward and backward state metrics. This is not unreasonable for the GSM format communication signals, for instance. Under this assumption, the forward and backward recursions can be carried independently. Once they are complete, the joint metric for any bits can be computed.

However, there are scenarios where the burst length or the state space prevents the storage of all the above variables. As such, one or more embodiments of the receiver circuit 32 are configured to use a window based approach. In one such approach, the forward recursion is carried as before. At index t, a backward recursion is carried from min(t+W,T), where W is the window size. When t+W<T, the starting state of the backward recursion is undetermined. The receiver circuit 32 is configured to set all the values $N_{t+W}(k)$ to the same constant, say 0, for example. The backward recursion is carried to index t, and the resulting values $N_t(k)$ are used to complete the bit metrics and soft value at index t.

Note that the backward recursion over the window is repeated for every index t. Thus a window based approach has higher complexity than that of the baseline, non-windowed approach. Also, a larger W results in better values for $N_t(k)$, whereas the complexity of one backward iteration is proportional to W. So W can be chosen to achieve the desired compromise of performance and complexity. Those skilled in the art will appreciate the many variants available for windowed approaches to processing.

However, regardless of whether the receiver circuit 32 is configured for windowed or non-windowed processing, it forms the core element of a super-receiver that uses enriched information fed forward from the equalizer circuit 34 to the decoder circuit 36. The enriched information is in joint metric form, and it expands upon and improves the SMAP equalizer structure. Broadly, the contemplated receiver circuit 32 enhances performance over a receiver using SMAP at a small incremental cost in complexity. As the various detailed examples demonstrate, various apparatus and method embodiments are contemplated for implementation of the receiver circuit 32, and, as such, the present invention is not limited by the foregoing disclosure, or by the accompanying figures. Indeed, the present invention is limited only by the following appended claims, and their legal equivalents.

What is claimed is:

1. A method in a wireless communication receiver of decoding modem bits from a received sequence of symbols comprising:

computing joint metrics, performed by a processor of the wireless communication receiver, each joint metric corresponding to a subset of the modem bits conveyed in the received sequence of symbols and indicating likelihoods for those modem bits taking on certain bit values, wherein computing the joint metrics comprises of computing Equation 7 comprising:

$$L'_t(x, y) = \min_{(i,j,k) \in \Omega'(x,y)} \{M_{t-1}(i) + \delta_t(i, j) + \delta_{t+1}(j, k) + N_{t+1}(k)\},$$

where triplet (i,j,k) denotes two consecutive connected branches, (i,j) from index t, and (j,k) from index t+1, set ω'(x,y) contains the triplets (i,j,k), where branch (i,j) has bit x set to 0 or 1, and branch (j,k) has bit y set to 0 or 1, $M_{t-1}(i)$ is the forward state metric for state i obtained from the forward recursion at index t−1, $N_{t+1}(k)$ is the forward state metric for state k obtained from the backward recursion at index t+1, $\delta_t(i,j)$ is the branch metric at time t from state i to state j, $\delta_{t+1}(j,k)$ is the branch metric at time t+1 from state i to state k;

generating side information for at least some of the modem bits represented in the joint metrics, wherein the side information for a given modem bit indicates that the given modem bit is more likely to have a particular bit value;

combining each joint metric with the side information for one or more modem bits represented in the joint metric, to obtain refined soft values for one or more remaining modem bits represented in the joint metric;

for those remaining modem bits that are coded, decoding the refined soft values to recover corresponding modem bits from the received sequence of symbols, and for those remaining modem bits that are uncoded, producing an improved estimate.

2. The method of claim 1, wherein generating the side information comprises demodulating the received sequence of symbols to produce initial soft values, wherein each initial soft value corresponds to one of the modem bits conveyed in the received sequence of symbols, and for a block of modem bits among the modem bits conveyed in the received sequence of symbols, decoding corresponding initial soft values to obtain output soft values, where each output soft value corresponds to one of the modem bits in said block of modem bits, and, to obtain the side information for a modem bit in the block of modem bits, subtracting the corresponding initial soft value from the corresponding output soft value.

3. The method of claim 1, wherein generating the side information comprises, in a first decoding iteration, for a block of modem bits among the modem bits conveyed in the received sequence of symbols, generating initial soft values, wherein each initial soft value corresponds to one of the modem bits, and decoding the initial soft values to obtain output soft values, where each output soft value corresponds to one of the modem bits in said block of modem bits, and, to obtain the side information for a modem bit in the block of modem bits, subtracting the corresponding initial soft value from the corresponding output soft value.

4. The method of claim 1, wherein computing the joint metrics includes selecting subsets of modem bits for which joint metrics are computed by, for a given joint metric, selecting a first modem bit that is a coded bit in a first codeword, and selecting a second modem bit that is un-coded or belongs to a separate, second codeword.

5. The method of claim 4, wherein generating the side information for the first modem bit of the given joint metric comprises decoding the first codeword according to any included error detection or correction coding and subtracting the resulting output soft value from the corresponding input soft value used for said decoding of the first codeword.

6. The method of claim 4, wherein computing the joint metrics includes selecting subsets of modem bits for which joint metrics are computed by, for a given joint metric, selecting a first modem bit that is earlier in a codeword, and selecting a second modem bit that is later in the same codeword.

7. The method of claim 1, further comprising computing the joint metrics in an initial demodulation process that is based on a joint simplified maximum a posteriori (JSMAP) equalizer.

8. The method of claim 7, further comprising selecting subsets of modem bits as pairs of modem bits from consecutive trellis stages in the JSMAP equalizer.

9. The method of claim 7, further comprising selecting subsets of modem bits as multiple modem bits from multiple, consecutive trellis stages in the JSMAP equalizer.

10. The method of claim 7, further comprising computing each joint metric as a function of forward and reverse branch metrics and state metrics, from trellis stages of the JSMAP equalizer that are associated with modem bits corresponding to the joint metric.

11. A receiver circuit configured for decoding modem bits from a received sequence of symbols and comprising:

an equalizer circuit configured to compute joint metrics, each joint metric corresponding to a subset of the modem bits conveyed in the received sequence of symbols and indicating likelihoods for those modem bits taking on certain bit values, wherein computing the joint metrics comprises of computing Equation 7 comprising:

$$L'_t(x, y) = \min_{(i,j,k) \in \Omega'(x,y)} \{M_{t-1}(i) + \delta_t(i, j) + \delta_{t+1}(j, k) + N_{t+1}(k)\},$$

where triplet (i,j,k) denotes two consecutive connected branches, (i,j) from index t, and (j,k) from index t+1, set Ω'(x,y) contains the triplets (i,j,k), where branch (i,j) has bit x set to 0 or 1, and branch (j,k) has bit y set to 0 or 1, $M_{t-1}(i)$ is the forward state metric for state i obtained from the forward recursion at index t−1, $N_{t+1}(k)$ is the forward state metric for state k obtained from the backward recursion at index t+1, $\delta_t(i,j)$ is the branch metric at time t from state i to state j, $\delta_{t+1}(j,k)$ is the branch metric at time t+1 from state j to state k; and a decoder circuit configured to:

generate side information for at least some of the modem bits represented in the joint metrics, wherein the side information for a given modem bit indicates that the given modem bit is more likely to have a particular bit value;

combine each joint metric with the side information for one or more modem bits represented in the joint metric, to obtain refined soft values for one or more remaining modem bits represented in the joint metric;

for those remaining modem bits that are coded, decode the refined soft values to recover corresponding modem bits from the received sequence of symbols; and for those remaining modem bits that are uncoded, produce an improved estimate.

12. The receiver circuit of claim 11, wherein the decoder circuit is configured to generate the side information by demodulating a sequence of received symbols to produce soft values, wherein each initial soft value corresponds to one of the modem bits conveyed in the received sequence of symbols, and for a block of modem bits among the modem bits conveyed in the received sequence of symbols, decoding corresponding initial soft values to obtain output soft values, where each output soft value corresponds to one of the modem bits in said block of modem bits, and, to obtain the side information for a modem bits in the block of modem bits, subtracting the corresponding initial soft value from the corresponding output soft value.

13. The receiver circuit of claim 11, wherein the decoder circuit is configured to generate the side information by, in a first decoding iteration, for a block of modem bits among the modem bits conveyed in the received sequence of symbols, generating initial soft values, wherein each initial soft value corresponds to one of the modem bits, and decoding the initial soft values to obtain output soft values, where each output soft value corresponds to one of the modem bits in said block of modem bits, and, to obtain the side information for a modem bit in the block of modem bits, subtracting the corresponding initial soft value from the corresponding output soft value.

14. The receiver circuit of claim 11, wherein the equalizer circuit is configured to select subsets of modem bits for which joint metrics are computed by, for a given joint metric, selecting a first modem bit that is a coded bit in a first codeword, and selecting a second modem bit that is un-coded or belongs to a separate, second codeword.

15. The receiver circuit of claim 14, wherein the decoder circuit is configured to generate the side information for the first modem bit in the given joint metric by decoding the first codeword according to any included error detection or correction coding, and subtracting the resulting output soft value from the corresponding input soft value used for said decoding of the first codeword.

16. The receiver circuit of claim 11, wherein the equalizer circuit is configured to select subsets of modem bits for which joint metrics are computed by, for a given joint metric, selecting a first modem bit that is earlier in a codeword, and selecting a second modem bit that is later in the same codeword.

17. The receiver circuit of claim 11, wherein the equalizer circuit comprises a joint simplified maximum a posteriori (JSMAP) equalizer.

18. The receiver circuit of claim 17, wherein the equalizer circuit is configured to select subsets of modem bits for which joint metrics are computed by selecting subsets of modem bits as pairs of modem bits from consecutive trellis stages in the JSMAP equalizer.

19. The receiver circuit of claim 17, wherein the equalizer circuit is configured to select subsets of modem bits for which joint metrics are computed as multiple modem bits from multiple, consecutive trellis stages in the JSMAP equalizer.

20. The receiver circuit of claim 17, wherein the equalizer circuit is configured to compute each joint metric as a function of forward and reverse branch metrics and state metrics, from trellis stages of the JSMAP equalizer that are associated with modem bits corresponding to the joint metric.

* * * * *

UNITED STATES PATENT AND TRADEMARK OFFICE
CERTIFICATE OF CORRECTION

PATENT NO. : 8,331,495 B2
APPLICATION NO. : 12/542335
DATED : December 11, 2012
INVENTOR(S) : Khayrallah It is certified that error appears in the above-identified patent and that said Letters Patent is hereby corrected as shown below:

In the Specifications:

In Column 9, Line 44, delete "$L_t+1$ (y)." and insert -- $L_{t+1}$ (y). --, therefor.

In the Claims:

In Column 13, Line 31, in Claim 1, delete " $\min_{(i,j,k) \in \Omega'(x,y)}$ " and insert -- $\min_{(i,j,k) \in \Omega'(x,y)}$ --, therefor.

In Column 13, Line 36, in Claim 1, delete "ω'(x,y)" and insert -- Ω'(x,y) --, therefor.

In Column 13, Line 43, in Claim 1, delete "state i" and insert -- state j --, therefor.

In Column 14, Line 57, in Claim 11, delete " $\min_{(i,j,k) \in \Omega'(x,y)}$ "and insert -- $\min_{(i,j,k) \in \Omega'(x,y)}$ --, therefor.

Signed and Sealed this
Second Day of April, 2013

Teresa Stanek Rea
*Acting Director of the United States Patent and Trademark Office*